April 11, 1933.  F. M. JACOBSSON  1,903,418
INTEGRATING METER FOR GRADED MEASUREMENTS
Filed Oct. 3, 1927   5 Sheets-Sheet 1

F. M. Jacobsson
INVENTOR

By: Marks & Clark
Attys.

April 11, 1933.  F. M. JACOBSSON  1,903,418
INTEGRATING METER FOR GRADED MEASUREMENTS
Filed Oct. 3, 1927  5 Sheets-Sheet 2

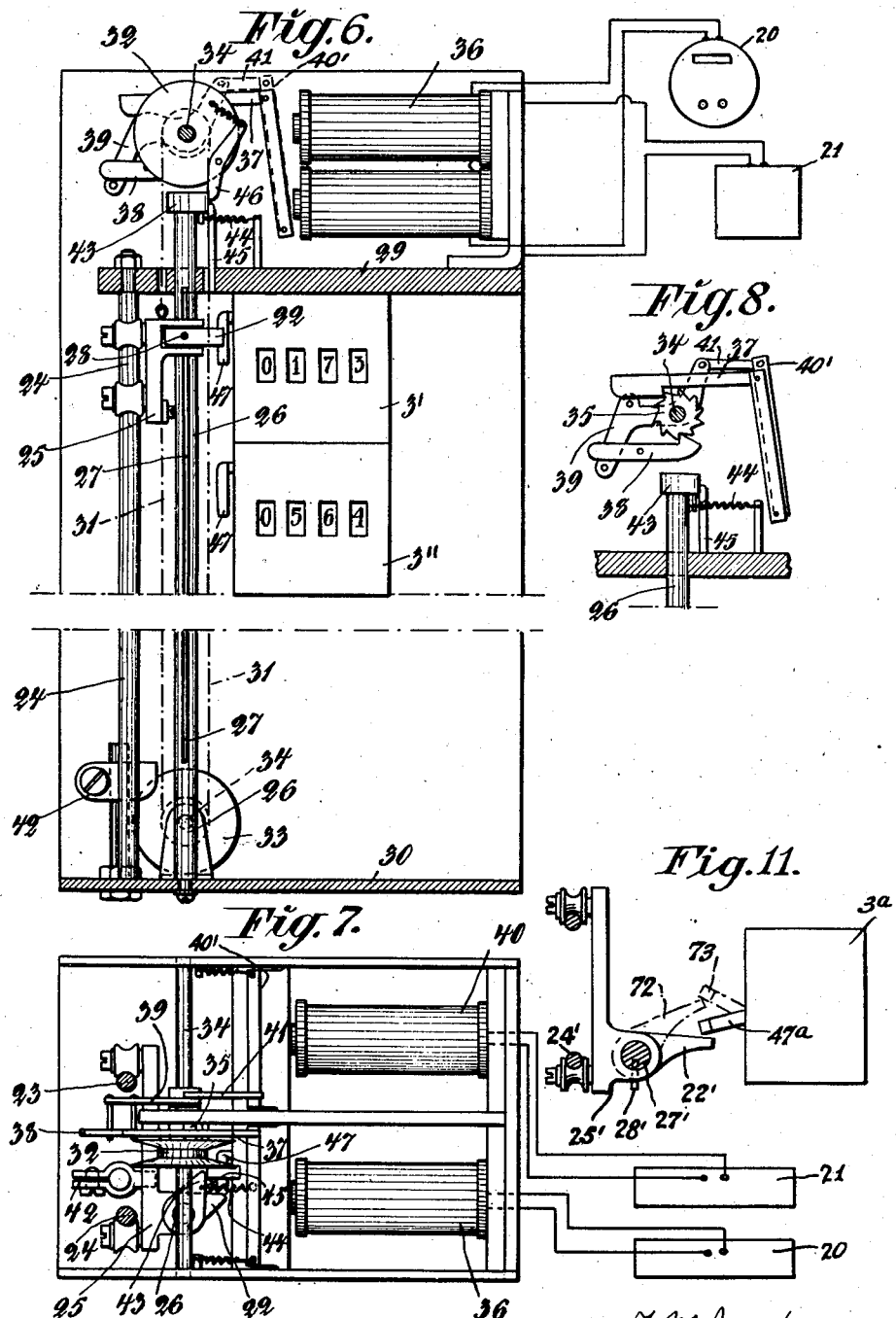

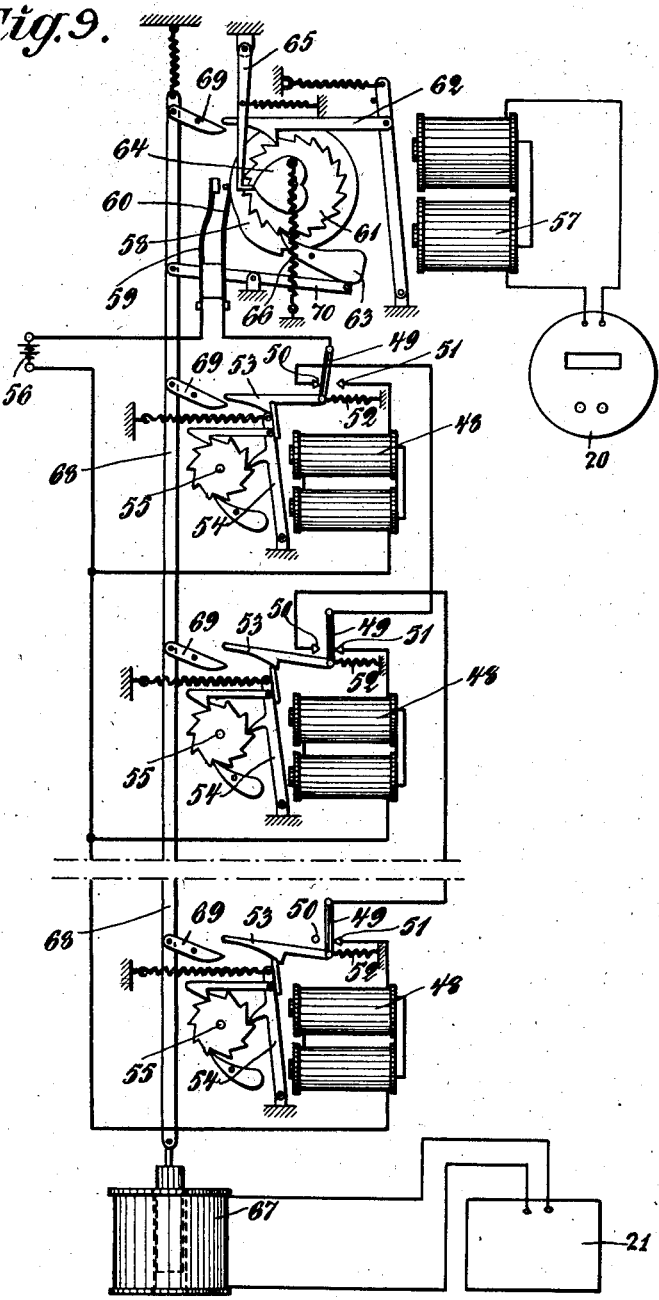

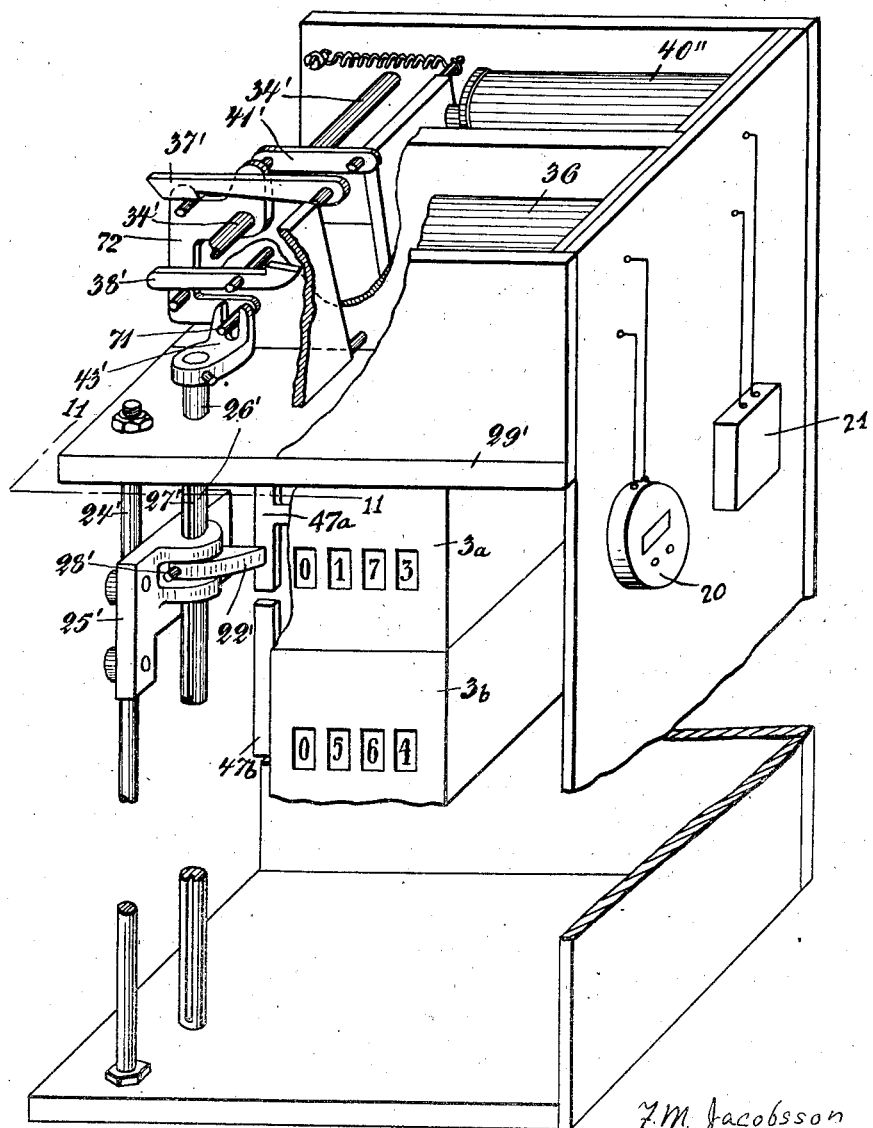

Patented Apr. 11, 1933

1,903,418

UNITED STATES PATENT OFFICE

FRITZ MAURITZ JACOBSSON, OF STOCKHOLM, SWEDEN, ASSIGNOR TO TELEFONAKTIE-
BOLAGET L. M. ERICSSON, OF STOCKHOLM, SWEDEN, A COMPANY OF SWEDEN

INTEGRATING METER FOR GRADED MEASUREMENTS

Application filed October 3, 1927, Serial No. 223,704, and in Sweden October 9, 1926.

Figure 1:
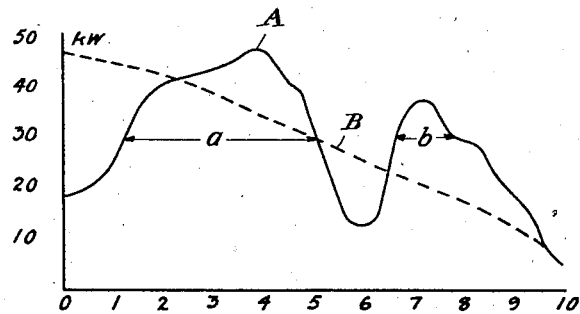

In technical investigations it is often necessary in a graphical-mathematical manner to treat quantities fluctuating irregularly when regarded as functions of the time. As examples of quantities of this kind the water flow of a river and the load on a power plant and the like may be mentioned. The fluctuating quantity is usually represented graphically as a function of the time in the form of a curve which generally, after the nature of the quantity is called curve of water flow, curve of load and the like. In Figure 1 of the accompanying drawings, a curve A is shown as an example representing an electrical output expressed in kilowatts as a function of time. If such curves, which may be called time curves, are to be treated, for example, for the calculation of the total flow in quantity of water, the total quantity of energy, and the like, it is in many cases preferred to transform the time curve into a curve of duration, duration being here used to denote the time, expressed in hours, days etc., during which the fluctuating quantity has reached or exceeded a certain value. The duration thus always refers to a certain value or a certain range of values of the power or the like. For the load curve in Figure 1, the duration for 30 kilowatts, for example, equals the sum of the distances $a$ and $b$ expressed in time units. If the duration for a sufficient number of power values is calculated the duration curve may be plotted the abscissa being said duration values and the ordinate the corresponding fixed power values. In Figure 1, the curve of duration B computed from the load curve A is shown as a dotted line. As will be seen, the curve of duration will be of a simpler form than the time curve, and is thus easier to treat mathematically.

Figure 2:
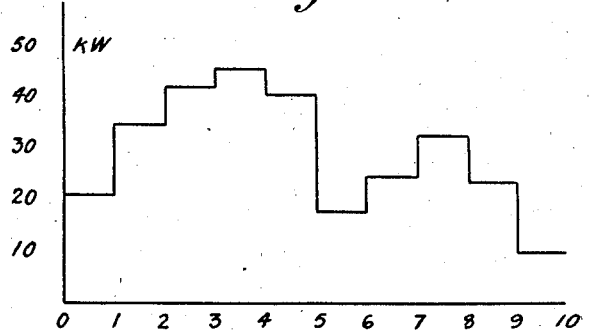

In producing curves of duration it is also possible to start from a time curve indicating the average value of the fluctuating quantity in question during consecutive and equal periods of time. Such a curve is shown in Figure 2, which represents the load curve of Figure 1, measured in average values referring to periods of a quarter of an hour. In a diagram according to Figure 2, the duration for a certain fixed output is obtained by calculating the time intervals when the average load has reached at least the fixed output value in question. For the fixed value of 30 kilowatts, the duration will thus, according to Figure 2, equal five time periods.

For the measuring of the average value of the fluctuating quantity, an integrating meter is preferably used, which registers the time integral of the fluctuating quantity over the time period. As example of meters of this kind, water meters, kilowatt-hour meters, ampère-hour meters, gas meters and wind meters may be mentioned.

Apparatus of this type are generally known and, as an example, the ordinary watthourmeter may be mentioned. In the ordinary watthourmeter the function to be integrated is the fluctuating load or power. The power passing the meter actuates then generally a small motor the speed of which is proportional to the instantaneous value of the load. This motor operates a counter and the result read off on the counter constitutes a value representing an integral, in which the variable is time and the integrand a function represented by the speed of the small motor. The readings on such a known apparatus, if read off once a day or once a month, constitute lump sums, i. e. the total energy consumption during the time interval between two consecutive readings.

In many cases this is not, however, a sufficient information. By way of example, the engineer in charge of a power plant may also want to know, how the load of the plant is distributed over the course of the day or the month. In other words, he wants to know during how many hours the plant has been running at full capacity, at ¾, ½ and ¼ of full capacity. This is usually done in such a manner that either the power meters or the kilowatthour meters are read for instance each quarter of an hour and the readings computed in a table, from which, after a circumstantial calculation, the information desired may be obtained.

Figure 3:
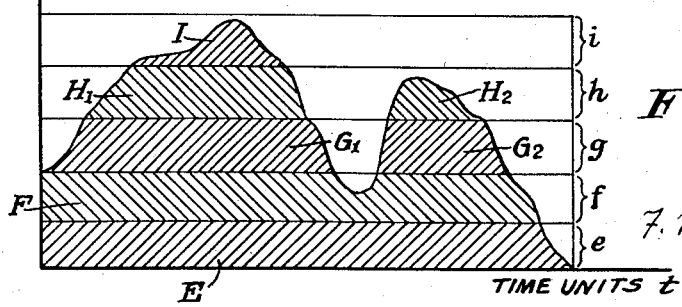

As another example, it is often desirable to debit the consumer according to a so-called graded tariff, in which case loads reaching or surpassing certain fixed limits are charged at a higher rate per kwh. than those falling below said limits. It is also conceivable that the values of the instantaneous loads are divided into a number of different zones or ranges $e, f$ etc. according to Fig. 3 of the accompanying drawings. For each such zone a special rate is charged for the number of kilowatthours consumed in that zone, which number according to the laws of mathematics are represented by the lined surfaces E, F etc. in each individual zone and which are of the dimension power × time.

It has not hitherto been possible to obtain said values E, F etc. directly without circumstantial readings and subsequent calculations. The present invention has for its object to eliminate the inconveniences connected with such known apparatus and to bring about an apparatus for direct reading of the values E, F etc. or their equivalents.

According to the invention one counter 3 is allotted to each zone $e, f$ etc. The driving member consists preferably of a small rotating motor device of a kind similar to that commonly used in watthour meters. The total angular displacement of said rotary member, counted from a certain starting point, is evidently at each instant proportional to $$\int_{t_0}^{t_1} P dt$$

where $t$ designates the time and P the power whereas $t_0$ denotes the time of starting the interval to be considered and $t_1$ the end of said interval. If said actuating member is allowed successively and in order of sequence to actuate the counters allotted to the different zones, each counter will be actuated once, provided the integral reaches the value corresponding to the zone of that counter before the time $t_1$. At the moment $t_1$ the actuating member is restored to zero position and the same procedure is repeated. If such restoration takes place every quarter of an hour, the counters indicate the number of time units during which a certain power zone has been reached or passed. If multiplied by the height of each zone counted in power units the surfaces A, B etc. are obtained. The counters may, of course, also be adapted to indicate directly power units × time units, by way of example, kilowatthours consumed in each zone.

To get an idea of the calculations and readings necessary to obtain the wanted information according to the old method the following Tables I and II are given as an example.

Table I

In a kilowatthourmeter connected into a power line the readings are made each hour from 6 A. M. to 4 P. M.

| Hour | Kwh. | Hourly consumption or hourly average load |
|---|---|---|
| 6 | 500 | |
| 7 | 519 | 19 |
| 8 | 547 | 28 |
| 9 | 585 | 38 |
| 10 | 628 | 43 |
| 11 | 670 | 42 |
| 12 | 697 | 27 |
| 13 | 720 | 23 |
| 14 | 751 | 31 |
| 15 | 776 | 25 |
| 16 | 790 | 14 |

Total 290. Mean value=29.

From this table the following table may be computed:

Table II

A load of 10 kw. is exceeded or attained during 10 hours
A load of 15 kw. is exceeded or attained during 9 hours
A load of 20 kw. is exceeded or attained during 8 hours
A load of 25 kw. is exceeded or attained during 7 hours
A load of 30 kw. is exceeded or attained during 4 hours
A load of 35 kw. is exceeded or attained during 3 hours
A load of 40 kw. is exceeded or attained during 2 hours
A load of 45 kw. is exceeded or attained during 0 hours which is the information wanted and which could be directly read off on an apparatus designed according to the present invention.

The setting of the actuating member is preferebly effected in known manner by means of current impulses produced by a contact device actuated by a movable part of the meter, while the counting devices may be actuated mechanically or electrically from said actuating member. The actuating member, however, may also be adapted to be driven mechanically from the meter. In place of an integrating meter, any other equivalent device may obviously be used, the speed of which is proportional to the momentary value of the fluctuating quantity.

The invention will be described more fully with reference to Figures 4 to 10 in the accompanying drawings, which represent three different embodiments of the invention.

Figure 4:
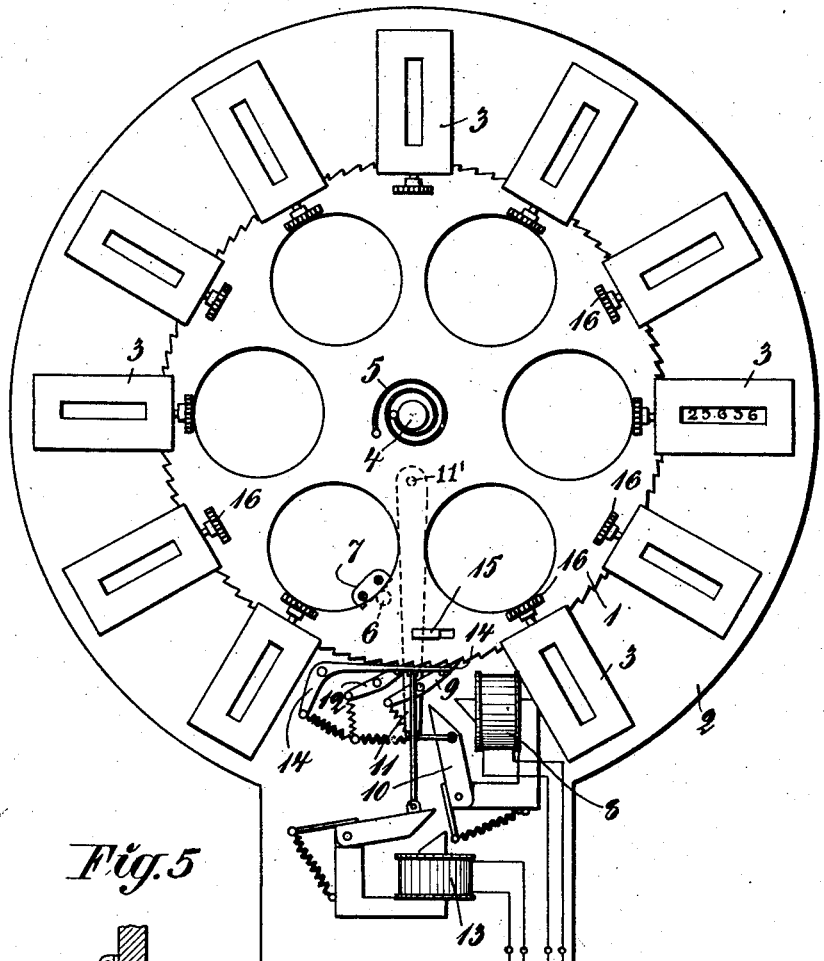
Figure 5:
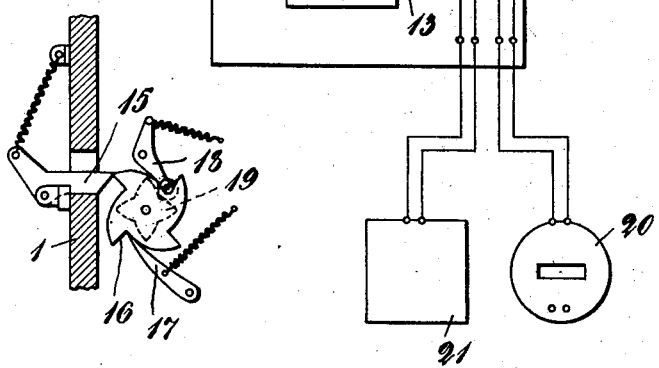

Figure 4 shows an embodiment of the invention having circularly arranged counting devices. Figure 5 shows a detail of the mechanism of the said embodiment. Figure 6 shows another embodiment provided with counting devices arranged vertically above one another. Figure 7 is a plan view of the same apparatus. Figure 8 illustrates a detail of the mechanism in the last mentioned embodiment. Figure 9 shows a third embodiment provided with electrically operated counting devices. Figure 10 is a perspective view of a modification of the apparatus according to Figures 6 and 7. Fig. 11 is a detail section on the line 11—11 of Fig. 10.

The apparatus shown in Figure 4 principally comprises a ratchet wheel 1, an electromagnetic stepping mechanism serving for the driving of this wheel, and a number of counters 3 arranged circularly on a stationary disk 2. The ratchet wheel 1 is rotatable about a fixed axis 4 and is actuated by a spiral spring 5 tending to turn the same back into the starting position shown in the drawings, in which the ratchet wheel abuts against a rigid abutment 7 by means of a pin 6 provided on the rear side of the wheel. The driving means consists of an electromagnet 8 and of a driving pawl 9 engaging into the teeth of the ratchet wheel, said pawl 9 being carried by a lever 11 pivotally connected with the armature 10 of the electromagnet, which lever is swingable about a fixed axis 11'. The ratchet wheel is locked in each advanced position by a pawl 12. The pawls 9 and 12 are arranged to be brought out of engagement with the ratchet wheel by means of a lever 14 actuated by a restoring electromagnet 13. The ratchet wheel carries a spring biased pawl 15 which in combination with the wheel 1 constitutes the actuating member and is adapted to cooperate with toothed wheels 16, which are arranged on the driving shafts of the different counters in such a manner that each shaft is turned one step when the pawl 15 moves past the corresponding counter. This arrangement is illustrated most clearly in Figure 4. The counter is locked against reversed movement by means of a pawl 17 and is also locked in each setting position by means of a spring-actuated lever 18 and a toothed wheel 19 cooperating therewith, said toothed wheel being attached to the shaft of the counter.

The electromagnet 8 is actuated by means of current impulses transmitted from an integrating meter 20, for instance a kilowatt-hour meter, which for this purpose is provided with a contact device not shown in the drawings, said contact device being actuated by a rotating part of the meter, for instance once for each revolution of the said part. The restoring electromagnet 13 is connected into a circuit controlled by a clock-work 21, which circuit is closed at even time intervals, for instance once for each quarter of an hour, the electro-magnet 13 then receiving a short current impulse every time, whereby the ratchet wheel 1 is restored to the normal position.

The actuating member here operates as an impulse collector adapted to receive primary impulses from the meter and transmitting secondary impulses (in this case mechanical impulses) to the counters, the number of primary impulses being a suitable multiple of the number of secondary impulses, so that the electro-magnet 8 will receive, for instance, 10 impulses, while the ratchet wheel is moving between two adjacent counters. The counters are preferably arranged at the same angular distance from each other. The first counter 3 is actuated, for example, by the tenth primary impulse, the second counter by the twentieth impulse, and so forth. As the number of primary impulses transmitted from the meter 20 per unit of time is proportional to the integral for the fluctuating quantity in question extended over said time, it will be obvious that different setting positions of the ratchet wheel 1 correspond to different values reached by said integral and that, consequently, the different counters represent certain fixed values of said integral expressed for instance in kilowatt hours. However, as all time periods are of the same duration, the different counters also represent different average values of the fluctuating quantity in question during a period by way of example the average load expressed in kilowatts. Consequently, the different counters will count the number of time periods, during which the value allotted to each counter has been reached or exceeded.

In the embodiment shown in Figures 5 to 7, the movable actuating member 22 is also arranged to be operated by electrical impulses from a meter through the medium of a ratchet mechanism. In this case, however, the actuating member is adapted to be moved in a rectilinear path past the different counters 3', 3" etc. arranged vertically above each other. The switching member consists of an arm 22 which is carried by a carriage 25 movable along guides 23, 24, the arm being then guided by a vertical shaft 26 provided with a longitudinal slot 27 engaged by a screw 28 threaded into the arm, so that the arm cannot turn in relation to the shaft 26. The shaft 26 is journalled in two frame plates 29, 30, of which plate 29 carries the ratchet mechanism.

The carriage 25 is carried by an endless cord, chain or the like 31 extended over an upper and a lower pulley 32 and 33 respectively, of which the upper pulley 32 is mounted on a shaft 34 and is rigidly connected with a ratchet wheel 35 provided on the same shaft, said wheel being adapted to be driven in a clockwise direction from the electromagnet 36 by means of a driving pawl 37. The ratchet wheel is retained in each set position by a pawl 38 which, together with the pawl 37, can be brought out of engagement with the ratchet wheel by means of a hook 39, pivoted on the shaft 34 for the purpose of restoring the mechanism to the normal position. The hook 39 is arranged to be actuated by a special restoring electromagnet 40, the armature 40' of which is connected with the said hook by means of a link 41.

When the ratchet mechanism is released, the carriage 25 returns to the starting position by its own weight, where it rests against an adjustable abutment 42. As in the embodiments above described, the restoring magnet 40 is actuated over a circuit controlled by a clock-work.

The actuation of the counters is effected by turning of the shaft 26, which for this purpose is provided at its upper end with an arm 43 kept normally bearing against a pin 45 by means of a spring 44. The said arm 43 is intended to be actuated by means of a spring-biased hook 46 arranged rotatably on the cord pulley 32, said hook 46 for each revolution of the cord pulley actuating the arm 43 and thus turning the shaft 26, so that the actuating member 22 is brought into engagement with a swingable actuating arm 47 of the counter in front of which the actuating member is positioned for the time being, whereby the counter receives a counting impulse. In this case, too, the ratchet mechanism may be disposed as an impulse storing device, 10 impulses, for instance, being required to turn the cord pulley 32 one revolution, which corresponds to a movement of the actuating member 22 from one counter to the following.

The embodiment shown in Figure 9 is based on the employment of electromagnetically driven counters, each counter being provided with an electromagnet 48, and with a shifting device actuated by said electromagnet, for the purpose of switching over the impulse circuit from one counter to the following. The shifting device consists of a swingable contact arm 49 and of two fixed contacts 50 and 51. The contact arm 49 is actuated by a spring 52 tending normally to keep the same in contact with the contact 51. Moreover, it is provided with a hook 53 adapted to cooperate with the armature 54 of the counter-electromagnet 48, which in known manner drives the shaft 55 of the counter by means of a ratchet mechanism.

The impulse circuit, which contains a source of current 56, is arranged to be broken and closed by means of an electromagnetic ratchet mechanism, the electromagnet 57 of which receives impulses from a meter in the manner described hereinbefore. This ratchet mechanism is arranged to actuate a contact device consisting of two contact springs 59, 60, by means of a cam disk 58, so that the contact 59, 60 is closed once for every revolution of the cam disk. The cam disk is rigidly connected with a ratchet wheel 61 mounted on the same shaft, said ratchet wheel being driven by means of a driving pawl 62 and locked by a pawl 63. Furthermore, the shaft of the ratchet wheel has mounted thereon a heart-shaped disk 64, against the circumference of which a spring-actuated arm 65 is adapted to bear, said arm tending to return the ratchet wheel to the starting position. The arrangement is such that the arm 65 bearing against the heart-shaped disk 64 cooperates with a tensile spring 66 also acting on said disk at a suitable point thereon so as to counteract the movement of the ratchet wheel during the first nine steps corresponding to a half revolution. At the tenth step being the step subsequent to that shown on the drawings, however, the arm 65 as well as the spring 66 will have a reversed action, so that the ratchet wheel while continuing to move in a clockwise direction, is all at once returned to normal position in which the point of the heart is directed towards the right. During the last mentioned movement, the contact 59, 60 is actuated, so that the impulse circuit is closed. In the drawings, the apparatus is shown in the position where the first or uppermost counter shaft 55 has been actuated by the first impulse and the ratchet mechanism is ready to send the second impulse. When the first counter was actuated, the contact arm 49 was adjusted by the armature 54 engaging the hook 53. Consequently, the second impulse will actuate the second counter which then, in turn, similarly switches the impulse circuit and prepares actuation of the third counter.

Restoring of the apparatus to the starting position is effected by means of a solenoid 67, the armature of which is connected with a spring-biased rod 68 carrying a number of hooks 69 operative only in the downward direction of movement of the rod, said hooks 69, on the solenoid 67 being energized from the clockwork 21 at even time intervals, actuating the different hooks 53 and 62, so that the actuating means of the counters as well as the ratchet mechanism 61, 62, 63 are restored to the normal position. In the lower position of the rod 68 the pawl 63 is then rendered inoperative by means of a lever 70 connected with said rod.

In the embodiments above described, all counters corresponding to such fixed values which fall within the range covered by the integral during a certain period are adapted to be actuated successively and in order of sequence during said period, whereby the various counters will indicate the total number of time periods during which the values of the fluctuating power have reached or exceeded the fixed values individual to each counter.

Figures 10 and 11 show a simplified modification of the arrangement according to Figures 6 to 8, said modification differing from said arrangement substantially only therein that only one of the counters being actuated only once at the last moment of each time period the actuated counter then corresponding to the extreme value reached by the integral during the time period in question.

From such an apparatus the information asked for cannot be attained by direct readings on the different counters, but is readily arrived at by adding to the reading of each counter all the readings of the superposed counters. For this object the shaft 26' is adapted to be turned by the actuation of the restoring magnet 40'', which in the example illustrated is effected by the arm 43', provided on the upper end of the shaft, engaging the restoring hook 72 by means of a pin 71 arranged on the latter. Moreover, an alteration has been made in so far that the actuating arms 47ₐ, 47ᵦ etc. of the counters are elongated so as to extend over a distance corresponding to the distance between two counters. Consequently, when the restoring magnet is energized, only that counter, in front of which the actuating member 22' is positioned for the time being, will be actuated. (The remaining parts 3ₐ, 3ᵦ, 25', 28', 24', 27', 29', 38', 34', 37', 41', corresponding to equivalent parts 3', 3'', 25 etc. in Figs. 6 to 8.) To prevent actuation of the other counters during the restoring of the actuating member to the starting position, the parts 22' and 47ₐ, 47ᵦ etc. are mutually disposed as indicated in Fig. 11. The normal positions are indicated in full lines. When the member 22' is brought to its actuating position 72 as indicated in dash and dot lines the adjacent arm 47ₐ is actuated and brought to the position 73 indicated in dash and dot lines. During the restoring movement the member 22' will remain in the turned position 72 and will therefore during its descent move behind the arms 47ᵦ etc. belonging to the lower counters and positioned right underneath the arm 47ₐ. The arm 47ᵦ and lower arms will apparently not be actuated. In such an arrangement, the counters do not indicate the duration of a certain value of the fluctuating quantity in question directly, but instead the time during which the quantity has fluctuated between two fixed limits determined by the distance between two consecutive counters. With the aid of these values, the curve of duration may easily be calculated, as mentioned above. The arrangement has the advantage that the different counters are actuated less often and, consequently, are subjected to less wear, while simultaneously the time passing before the counter has reached the limit for its counting capacity will be longer, what again, affords the possibility of effecting readings with longer time intervals, without any doubt as to whether the counting limit of the mechanism has been passed.

In all embodiments of the invention above described the counting devices actually register different limit values of the integral reached during each period of time. It is therefore evident that the invention principally consists in a method for registering the integral described.

I claim:
1. An apparatus for graded measurements of a fluctuating quantity comprising an integrating meter, a number of counters, means for the individual actuation of the said counters in accordance with the advancement of said meter, timed means for the automatic and periodical restoration of said actuation means to starting position at even fixed time intervals.

2. An apparatus for graded measurements of a fluctuating quantity comprising an integrating meter, a number of counters, means for the individual actuation of said counters in a predetermined order of sequence in accordance with the advancement of said meter, timed means for the automatic and periodical restoration of said actuation means to starting position at even fixed time intervals.

3. An apparatus for graded measurements of a fluctuating quantity comprising an integrating meter, a number of counters, electromagnetic means for the individual actuation of said counters in a predetermined order of sequence, means controlled by the meter for the sending of current impulses to operate said electromagnetic means in accordance with the advancement of the meter, timed means for the automatic and periodical restoration of said electromagnetic means to starting condition at even fixed time intervals.

4. An apparatus for graded measurements of a fluctuating quantity comprising an integrating meter, a number of counters, electromagnetic means for the individual actuation of said counters in a predetermined order of sequence, an impulse collector, means controlled by the meter for sending primary current impulses to operate said impulse collector, means for causing the impulse collector to send secondary current impulses in a reduced number to operate said electromagnetic means in accordance with the advancement of the meter, timed means for the automatic and periodical restoration of said electromagnetic means to starting condition at even fixed time intervals.

5. An apparatus as claimed in claim 4, in which the electromagnetic means consists of a number of electromagnets adapted to control a corresponding number of impulse counters and arranged to be brought into operation in succession by the secondary impulses sent from the impulse collector.

In testimony whereof I affix my signature.
FRITZ MAURITZ JACOBSSON.